(No Model.)

J. P. HOFFMANN.
HORSE COLLAR PAD.

No. 318,251. Patented May 19, 1885.

WITNESSES
Edwin L. Yewell
Chas. H. Davis

INVENTOR
J. Paul Hoffmann
By [signature]
Attorney

United States Patent Office.

JOHN PAUL HOFFMANN, OF DUBUQUE, IOWA.

HORSE-COLLAR PAD.

SPECIFICATION forming part of Letters Patent No. 318,251, dated May 19, 1885.

Application filed March 9, 1885. (No model.)

*To all whom it may concern:*

Be it known that I, JOHN PAUL HOFFMANN, a citizen of the United States, residing at Dubuque, in the county of Dubuque and State of Iowa, have invented certain new and useful Improvements in Horse-Collar Pads, of which the following is a specification, reference being had therein to the accompanying drawings.

My invention relates to improvements in pads for collars used on animals, and is designed to be used in connection with any form of collar to bring the weight of the same on the neck and the top of the shoulders, and not lower down on the shoulders, where the animal is often afflicted with disease.

The use of this pad obviates the necessity of obtaining a collar especially adapted to the diseased animal.

The improvement consists, essentially, in the form and construction of the pad.

Figure 1:
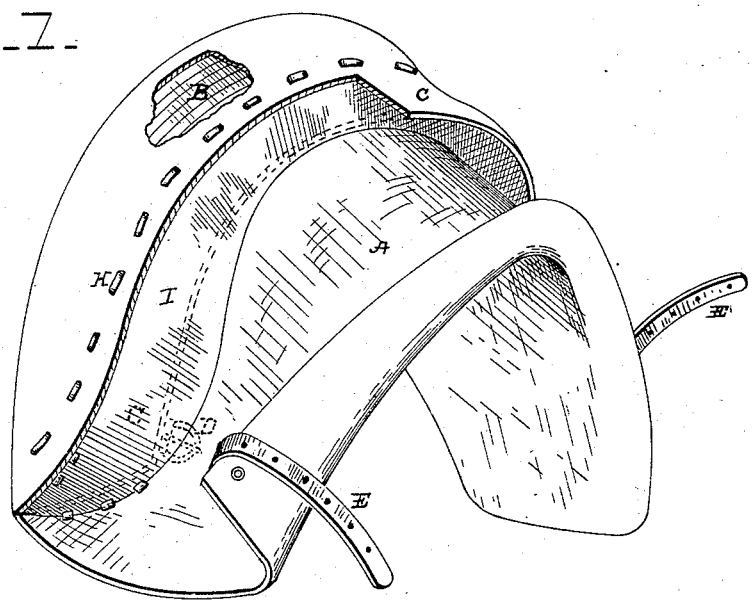
Figure 3:
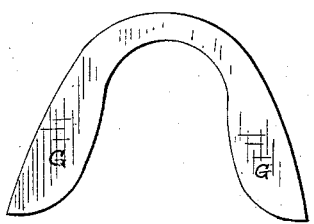
Figure 2:
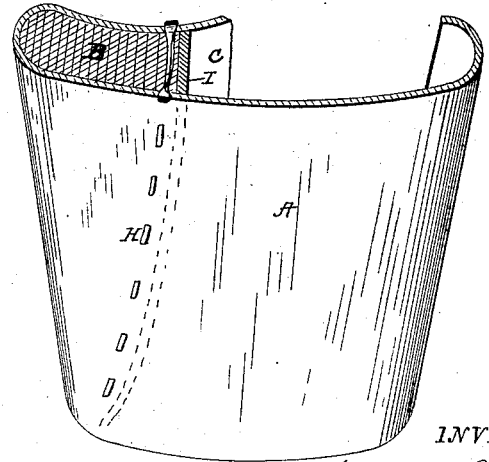

In the figures of the annexed drawings, Figure 1 represents a perspective view of the pad with portions broken away; Fig. 2, a sectional view from the under side; and Fig. 3, a view showing the shape of the filling.

The parts of the pad consist, essentially, in the leather A, which rests directly on the animal's neck and shoulders, and on which rests the collar, and a filling or packing, B. The part A (which is preferably constructed of leather) is turned upward on both sides, one flap, C, having buckles D and the other straps E. Other fastening devices may be used. By this means the pad is securely fastened to the collar and is prevented from slipping. Under the flap C the filling B, of leather or other material, is so shaped as to rest on both the neck and the upper portion of the shoulders. To make the fit more effective, the filling is preferably made of the shape shown in Fig. 3, the ends G of the bow being enlarged, as shown. The leather filling may have a backing of hair or the like to make the bearing-surfaces soft and pliable.

The preferable mode of keeping the filling in place is shown by the line of stitching H. An exterior piece or facing, I, forms a bearing which rests against the collar and keeps the pad in place when in use. The facing I also extends around the ends of the packing, and serves to hold it more securely in place, and also to produce a nice finish.

When in use, the padded or filled portion is toward the rear and the thin part toward the front, thus making an enlargement at the top of the collar, which arrangement will relieve the animal from any strain at the middle portion of the shoulder, preventing thereby disease from the said contact, and aiding in its cure, when already progressing, by the relief from pressure.

As slight modifications of form and construction may be necessary in the adaptation of the device, the right to vary consistent with the spirit of the invention is reserved, the same being applicable to the material used also, as zinc or other metal pressed into shape may be used.

I claim—

As an article of manufacture, a collar-pad having a filling, packing, or enlargement resting to the rear of the collar-bearing portion, said filling, packing, or enlargement increasing in size in its downwardly-projecting portions, substantially as and for the purpose specified.

In testimony whereof I affix my signature in presence of two witnesses.

JOHN PAUL HOFFMANN.

Witnesses:
G. B. HUCKELS,
THEO. J. HUCKELS.